(12) United States Patent
Leger et al.

(10) Patent No.: US 12,165,280 B2
(45) Date of Patent: Dec. 10, 2024

(54) METHOD FOR CONTROLLING THE DISPLAY OF INFORMATION ON A SCREEN OF AN ELECTRONIC DATA-INPUT DEVICE, CORRESPONDING DEVICE AND COMPUTER PROGRAM PRODUCT

(71) Applicant: BANKS AND ACQUIRERS INTERNATIONAL HOLDING, Suresnes (FR)

(72) Inventors: Michel Leger, Paris (FR); David Naccache, Paris (FR)

( * ) Notice: Subject to any disclaimer, the term of this patent is extended or adjusted under 35 U.S.C. 154(b) by 101 days.

(21) Appl. No.: 17/800,083

(22) PCT Filed: Feb. 9, 2021

(86) PCT No.: PCT/EP2021/053108
§ 371 (c)(1),
(2) Date: Aug. 16, 2022

(87) PCT Pub. No.: WO2021/165104
PCT Pub. Date: Aug. 26, 2021

(65) Prior Publication Data
US 2023/0334624 A1 Oct. 19, 2023

(30) Foreign Application Priority Data
Feb. 17, 2020 (FR) ....................................... 2001550

(51) Int. Cl.
*G06T 3/60* (2024.01)
(52) U.S. Cl.
CPC ........ *G06T 3/60* (2013.01); *G06F 2200/1614* (2013.01)

(58) Field of Classification Search
CPC ................. G06F 2200/1614; G06F 2200/1637
See application file for complete search history.

(56) References Cited

U.S. PATENT DOCUMENTS 5,757,369 A 5/1998 Ohsawa et al.
2018/0331991 A1* 11/2018 Kim ....................... G06F 3/0486

FOREIGN PATENT DOCUMENTS

EP 1001388 A2 * 5/2000 ........... G07F 7/0866
EP 2065783 A1 6/2009
(Continued)

OTHER PUBLICATIONS

English translation of the Written Opinion of the International Searching Authority dated May 11, 2021 for corresponding International Application No. PCT/EP2021/053108, filed Feb. 9, 2021.
(Continued)

*Primary Examiner* — Samantha (Yuehan) Wang
(74) *Attorney, Agent, or Firm* — David D. Brush; Westman, Champlin & Koehler, P.A.

(57) ABSTRACT

A method for controlling the display of information on a screen of a data-input electronic device. The electronic device is intended to be used for implementing an operation involving the performance of a succession of actions and involving a plurality of users. According to the proposed technique, the method includes: detecting a predetermined event associated with the electronic device, delivering a signal that is representative of a detection of the predetermined event; rotating the display of information on the screen of the electronic device through 180°, as a function of the signal representative of detecting the predetermined event and a piece of state information associated with the electronic device.

7 Claims, 3 Drawing Sheets

(56) References Cited

FOREIGN PATENT DOCUMENTS

EP 2919208 A1 9/2015
WO 2014023447 A1 2/2014

OTHER PUBLICATIONS

International Search Report dated Apr. 30, 2021for corresponding International Application No. PCT/EP2021/053108, filed Feb. 9, 2021.
Written Opinion of the International Searching Authority dated Apr. 30, 2021 for corresponding International Application No. PCT/EP2021/053108, filed Feb. 9, 2021.
French Search Report and Written Opinion with English machine translation dated Oct. 29, 2020 for corresponding French Application No. 2001550, filed Feb. 17, 2020.

\* cited by examiner

METHOD FOR CONTROLLING THE DISPLAY OF INFORMATION ON A SCREEN OF AN ELECTRONIC DATA-INPUT DEVICE, CORRESPONDING DEVICE AND COMPUTER PROGRAM PRODUCT

CROSS-REFERENCE TO RELATED APPLICATIONS

This Application is a Section 371 National Stage Application of International Application No. PCT/EP2021/053108, filed Feb. 9, 2021, which is incorporated by reference in its entirety and published as WO 2021/165104 A1 on Aug. 26, 2021, not in English.

TECHNICAL FIELD

The field of the invention is that of electronic data-input devices used to perform operations which require the input and/or verification of information by more than one party.

PRIOR ART

Some operations, implemented via an electronic data-input device, require an input and/or a verification of data on said device by several parties. This is the case, for example, of payment transactions between a merchant and a client, performed by means of a payment terminal. Typically, to implement such a payment transaction, the merchant begins by performing some operations on the payment terminal, in particular the input of the amount of the good or service that the client wishes to acquire or obtain. Afterwards, the merchant proceeds with the introduction of a payment card supplied by the client into a card reader associated with or integrated into the payment terminal. Possibly, the merchant could ask the client to insert his payment card himself into the card reader. Afterwards, the merchant presents the payment terminal to the client, so that the latter could enter the confidential code (PIN code) associated with his payment card. Once this input has been performed by the client, the merchant regains control of the payment terminal, in order to confirm the transaction, verifies that it is actually authorised, and validate, for example, printing of one or more payment receipts.

In other situations, a client may also be required to consult information input by a merchant on an electronic data-input device, in order to verify its accuracy. For example, when creating a loyalty account, a merchant could ask a client to verify that his name has been correctly spelled, and that his postal and electronic details are correctly entered. In this case, the client does not himself input information directly on the electronic data-input device, but he must be able to read a screen of this device in order to verify the information input by the merchant. Also, herein again, the implementation of such an operation implies that the data-input device (or at least a screen of this device) is presented to the client after the merchant has input information therein.

Yet, in many situations, the different users having to intervene on the electronic data-input device—a merchant and a client for example—are located on either side of a counter on which the data-input device (typically a payment terminal or a computer) is positioned. In such a very classic configuration, the merchant and the client are therefore face-to-face, and the operation consisting in repeatedly manipulating the electronic data-input device (or at least one portion of this device) so that each (the merchant and the client) could in turn intervene to carry out, in connection with this device, the actions which are incumbent on him might turn out to be difficult and impractical to carry out, in particular when the space available on the counter is limited.

Hence, there is a need to propose solutions that facilitate the intervention of multiple parties on the same electronic data-input device.

SUMMARY OF THE INVENTION

The proposed technique offers a solution that does not present at least some of these problems of the prior art, thanks to an original method for controlling the display of information on a screen of an electronic data-input device. The electronic device is configured to be used to implement an operation involving the completion of a succession of actions and involving a plurality of users (more than two). According to the proposed technique, the method comprises:
a step of detecting a predetermined event associated with said electronic device, delivering a signal representative of a detection of said predetermined event;
a step of rotating said information display by 180° on the screen of the electronic device, as a function of said signal representative of a detection of said predetermined event and of a status piece of information associated with said electronic device.

Thus, the generation of a predetermined event allows causing the 180° rotation of the display of information on the screen of the electronic device. In this manner, the proposed technique allows simplifying the physical manipulations that a first user must perform on the electronic data-input device in order to enable a second user to use this device in turn. More particularly, when both users are face-to-face, and when a 180° rotation of the display as proposed is implemented, a simple tilting from front to back (or from back to front) of the screen of the electronic data-input device—i.e. a manipulation that is simple and quick to execute, which could also be carried out in a limited space—is enough to make it usable by the other user. The 180° rotation of the display is conditioned on the detection of the predetermined event, but also on a status piece of information associated with said electronic device. In this manner, even though the predetermined event is detected, the 180° rotation of the display is performed only when the electronic data-input device is in a current state enabling it, i.e. at a progress level of the operation being carried out on the device where such a rotation is justified (for example because the next action of the successions of actions that form the operation should be performed by a user different from that one who has just finished the current action).

In a particular embodiment of the proposed technique, said predetermined event corresponds to a press on a button of said electronic device.

In this manner, the predetermined event is particularly simple to generate, by means of a basic manipulation, which is quick and not very complex to implement.

According to a particular feature, said button is a button for validating the completion of a predetermined action of said succession of actions.

In this manner, the generation of the predetermined event is carried out transparently for the user, because it is integrated into the sequence of usual actions performed to carry out the current operation on the electronic data-input device. Thus, the electronic data-input device may be configured so that the predetermined event is generated when well-identified validation buttons are pressed, for example those which, in the context of the current operation, validate the switch from a graphical interface associated with a current action carried out by a user into a graphical interface associated with a next action normally to be carried out by another user, different from the first one.

In another particular embodiment of the proposed technique, said predetermined event corresponds to a reversal of the pitch of said screen of said electronic device, subsequent to a tilting of said screen about a pitch axis of said screen.

In this manner, the predetermined event is simple to generate, by means of a basic manipulation, which is quick and not very complex to implement, which also corresponds to a manipulation allowing at the same time orienting the electronic data-input device in a favourable position for use thereof by another user.

In a particular embodiment of the proposed technique, said method for controlling the display of information on a screen of an electronic data-input device further comprises a step of identifying a current action to be carried out within said succession of actions, and in that the implementation of said 180° rotation step further depends on said identified current action.

In this manner, the status piece of information associated with said electronic device may in particular be in the form of an identification of a progress status of the operation being carried out on the electronic data-input device.

In a particular embodiment of the proposed technique, said method comprises a step of triggering steps for protecting said electronic data-input device, when the following two conditions are met:
  said predetermined event is detected; and
  said status piece of information associated with said electronic device is absent from a list of reference states associated with said electronic device for said operation.

According to a particular feature, said steps for protecting said electronic data-input device belong to the group comprising at least:
  turning off said screen of the electronic device;
  deleting or masking at least part of the information displayed on said screen of the electronic device;
  disabling at least one touch button displayed on said screen of the electronic device;
  disabling at least one physical button of said electronic device;
  triggering an audible alarm.

In this manner, at least part of the functionalities of the electronic data-input device may be blocked if the predetermined event is detected while the electronic data-input device is in a state that does not normally justify, with regards to the progress of the operation being carried out on the electronic device, to hand over to another user. Such protective steps aim, for example, to hide potentially sensitive information previously displayed on the screen, in order to make it inaccessible to an unauthorised user, and/or to prevent this unauthorised user from interacting with the electronic data-input device.

In a particular embodiment of the proposed technique, said electronic device is a payment terminal and in that said operation is a payment transaction.

According to another aspect, the proposed technique also relates to an electronic device intended to be used to implement an operation involving the completion of a succession of actions and involving a plurality of users. Such an electronic device comprises a screen for displaying information related to said operation. Furthermore, this device comprises:

means for detecting a predetermined event associated with said electronic device, delivering a signal representative of a detection of said predetermined event;
  means for rotating said information display by 180° on the screen of the electronic device, implemented as a function of said signal representative of a detection of said predetermined event and of a status piece of information associated with said electronic device.

In a particular embodiment, the screen of the electronic data-input device is pivotally mounted about a pitch axis of said screen.

In this manner, in the conventional case where two users having to intervene on the electronic data-input device are positioned face-to-face, a simple and rapid manipulation of the screen of the electronic data-input device, namely a simple guided tilting of this screen about its pitch axis, allows orienting it towards either one of the users, depending on the action to be carried out in the context of the current operation.

According to a particular feature, said electronic data-input device comprises means for detecting a reversal of the pitch of said screen, subsequently to a tilting of said screen about said pitch axis.

In this manner, the reversal of the pitch of the screen of the electronic data-input device may serve as an event to be detected, and serve as a condition for the implementation of the 180° rotation of the information displayed on the screen of the electronic device.

In a particular embodiment, the screen of the electronic data-input device is a touchscreen.

In this manner, the 180° rotation of the information displayed on the screen of the electronic device may also concern means for inputting data displayed on the screen (such as a touch keyboard), allowing automatically adapting the orientation of these input means according to an orientation of the screen of the electronic device (and more particularly, depending on whether this screen is oriented towards either one of two users positioned face-to-face).

In a particular embodiment, the screen of the electronic data-input device is a lenticular screen.

In this manner, the information displayed (and/or input, if the screen is tactile) on the screen of the electronic device—potentially sensitive—is not visible to a user when the screen is oriented towards another user.

According to a preferred implementation, the different steps of the method for controlling the display of information according to the proposed technique are implemented by one or more computer software or programs, comprising software instructions intended to be executed by a data processor depending on the proposed technique and being designed to control the execution of the different steps of the method.

Consequently, the proposed technique also aims a program, likely to be executed by a computer or by a data processor, and in particular a secure processor, this program including instructions for controlling the execution of the steps of a method as mentioned hereinabove.

This program may use any programming language, and be in the form of source code, object code, or intermediate code between source code and object code, such as in a partially compiled form, or in any other desirable form.

The proposed technique also aims an information medium readable by a data processor, and comprising instructions of a program as mentioned hereinabove.

The information carrier may be any entity or device capable of storing the program. For example, the medium may include a storage medium, such as a ROM, for example a CD ROM or a microelectronic circuit ROM, or else a magnetic recording means, for example a floppy disk or a hard disk.

On the other hand, the information medium may be a transmissible medium such as an electrical or optical signal, which could be conveyed via an electrical or optical cable, by radio or by other means. In particular, the program according to the proposed technique may be downloaded from a network of the Internet type.

Alternatively, the information medium may be an integrated circuit in which the program is incorporated, the circuit being adapted to execute or to be used in the execution of the considered method.

According to one embodiment, the proposed technique is implemented by means of software and/or hardware components. In this sense, the term "module" may correspond in this document to a software component, a hardware component or a set of hardware and software components.

A software component corresponds to one or more computer programs, one or more sub-programs of a program, or more generally to any element of a program or software able to implement a function or a set of functions, as described hereinbelow for the considered module. Such a software component is executed by a data processor of a physical entity (terminal, server, gateway, router, etc.) and is likely to access the hardware resources of this physical entity (memories, recording media, communication buses, input/output electronic boards, user interfaces, etc.).

In the same manner, a hardware component corresponds to any element of a hardware assembly able to implement a function or a set of functions, according to what is described hereinbelow for the considered module. It may be a hardware component that is programmable or has an integrated processor for executing software, for example an integrated circuit, a chip card, a memory card, an electronic board for the execution of a firmware, etc.

Of course, each component of the previously-described system implements its own software modules.

The different above-mentioned embodiments can be combined together for the implementation of the invention.

FIGURES

Other features and advantages of the invention will appear more clearly upon reading the following description of a preferred embodiment of the invention, given as a mere illustrative and non-limiting example, and the appended drawings, among which:

Figure 6:
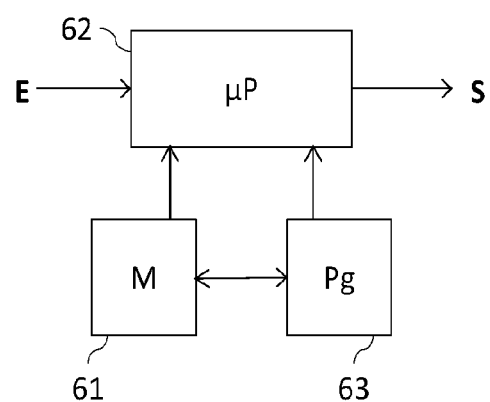

FIG. 6 describes a simplified architecture of an electronic data-input device for the implementation of the proposed technique, in a particular embodiment.

DETAILED DESCRIPTION OF THE INVENTION

The proposed technique aims to facilitate the intervention of multiple users on the same electronic data-input device, during the implementation of an operation involving the completion of a succession of actions on said electronic data-input device, by a plurality of actors (at least two). For example, the considered operation may be a payment transaction carried out between a merchant and a client, by means of a payment terminal. As already described in connection with the prior art, the implementation of such a transaction actually requires the completion of a succession of actions on the payment terminal (the input of an amount, the input of a confidential code associated with a payment card, the validation of a receipt printing command, etc.) which, depending on the current action to be carried out, are implemented either by the merchant or by the client. In the remainder of the document, the proposed technique as well as the described various embodiments are mainly illustrated in the context of this example of a payment transaction implemented between a merchant and a client via a payment terminal. However, it should be understood that this example is merely illustrative and not limiting, and that the proposed technique also applies to electronic data-input devices other than a payment terminal and to operations other than a payment transaction.

The general principle of the proposed technique consists in operating, when some conditions are met, a 180° rotation of the information displayed on a screen of the electronic data-input device. More particularly, such a rotation of the display should be able to be implemented after a first user has performed a current action of the succession of actions to be performed to carry out the desired operation, and when the next action should be implemented by a second user different from the first user. Such a rotation of the display allows simplifying the physical manipulations to be performed on the electronic data-input device by the first user so that the second user is able to use it (or at least to consult information that is displayed therein) optimally. In particular, when the two users are face-to-face, and when such a rotation of the display is implemented, a simple tilting from front to back (or from back to front) of the screen of the electronic data-input device is sufficient to make it usable by the other user, in particular for consulting information. Furthermore, when the screen of the electronic data-input device is a touchscreen, which is the case in a particular embodiment of the proposed technique, the input of information by the other user is also simplified since the elements displayed on the screen of the electronic data-input device may comprise a touch keyboard allowing inputting data. It should be kept in mind that in the context of the present disclosure, it is not the modification of the orientation of the device as such which triggers the rotation of the display, but the detection of a particular event, related to the processing of data within the device, which causes this rotation (in a particular embodiment of the proposed technique, described later on, the particular event could nonetheless be in the form of such a modification of the orientation of the device).

Figure 1:
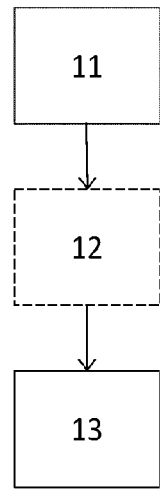
FIG. 1 illustrates the steps of the method for controlling the display of information on a screen of an electronic data-input device, in a particular embodiment of the proposed technique.

Hence, the proposed technique relates, according to a first aspect illustrated in connection with FIG. 1 in a particular embodiment, to a method for controlling the display of information on a screen of an electronic data-input device.

This method comprises a step 11 of detecting a predetermined event associated with the electronic data-input device. This step 11 delivers, when said predetermined event is detected (for example a validation, by the first user of a particular function key, or of a particular data processing taking place within the device), a signal representative of a detection of said event. Depending on the implemented embodiments, the predetermined event may be of a different nature.

Figure 2:
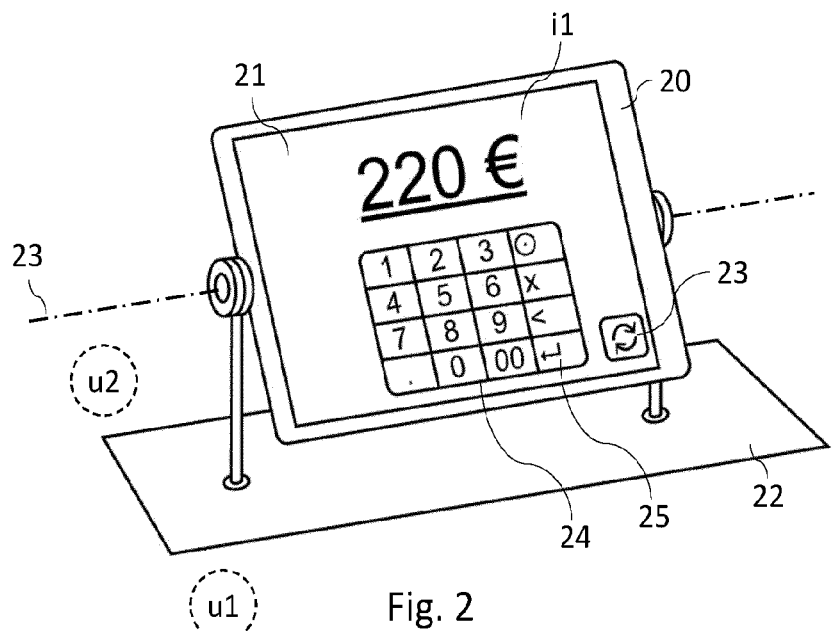
FIG. 2 shows an electronic data-input device with the screen oriented towards a first user, as seen by the first user, in a particular embodiment of the proposed technique.

To illustrate these different predetermined event types, an example of an electronic data-input device 20 able to implement the proposed technique is shown in connection with FIG. 2. This device 20 comprises a screen 21 pivotally mounted on a base 22 intended to be fastened or simply set on the frame. The axis 23 about which the screen could pivot is substantially parallel to the set-up plane of the device, and it is referred to in the rest of the document as the pitch axis to the extent that it defines a transverse axis allowing operating a tilting from front to back of the electronic data-input device. The set-up plane is defined as the plane that contains the points and/or lines and/or surfaces of the device intended to be in contact with a support, when the device is set on this support under normal conditions of use. Most often, such a support is horizontal, and it may be, for example, the surface of a table or a counter. In other words, under normal condition of use, i.e. when the base of the electronic data-input device is set on a substantially horizontal surface, the axis about which the screen could pivot is also substantially horizontal. In this manner, the screen 21 could pivot about the pitch axis 23 between a first set of positions in which it is oriented towards a first user u1 (for example a merchant positioned on one side of a counter), as illustrated in FIG. 2, and a second set of positions in which it is oriented towards a second user u2 (for example a client positioned on the other side of the counter) who stands facing the first user, as illustrated for example in FIGS. 3 and 4.

In a particular embodiment, the predetermined event to be detected at step 11 is exactly a tilting of the electronic data-input device from a position in which the screen is oriented towards a first user (for example the user u1 of FIG. 2) into a position in which the screen is oriented towards a second user who faces the first user (for example the user u2 of FIG. 2), this tilting normally taking place in the context of a particular treatment within the device. In other words, the predetermined event to be detected corresponds to a reversal of the pitch of the screen 21 of the electronic data-input device, subsequent to a tilting of said screen 21 around the pitch axis 23 of this screen. Such a detection may be implemented by means of sensors integrated into the electronic data-input device, such as an inclinometer or a gyrometer.

In another particular embodiment, the predetermined event to be detected at step 11 is a press on a button of the electronic data-input device. According to a particular feature, this button is a touch button displayed on the screen (in this case tactile) of the device. According to another particular feature, whether physical or tactile, this button is a button exclusively dedicated to the implementation of a 180° rotation of the display: in other words, this button then has no functions other than that of generating a signal representative of a detection of said predetermined event when it is pressed. The button 23 represented in FIG. 2 illustrates an example of a touch button of this type. According to a particular feature, when the button is tactile, its display on the screen of the electronic data-input device may be conditioned according to a context of use of the electronic data-input device. Thus, for example, the dedicated touch button 23 is displayed only on some graphical interfaces associated with well-identified actions of the succession of actions that form the operation being carried out on the electronic data-input device. For example, the dedicated touch button 23 is displayed only on the interfaces corresponding to actions whose completion is the responsibility of a user different from the user in charge of carrying out the previous or next action, in the succession of actions that form the operation to be implemented. Alternatively, according to another particular feature, the considered button is not exclusively dedicated to the implementation of a 180° rotation of the display. In the case of a payment terminal, it is for example a press on the button for validating the amount of the transaction which causes the automatic rotation of the display. Hence, such a button fulfils several functions simultaneously: validating a current action, displaying the interface associated with the next action, and operating a 180° rotation of the displayed information. In one embodiment, the button 25 of the touch keyboard 24 represented in FIG. 2 corresponds to a button of this type: this button 25 actually corresponds to the button for validating the amount of the transaction, a press on this button validates this amount, causes the display of the interface for inputting a PIN code, and operates a 180° rotation of this interface so that it is correctly oriented for the client once the screen is tilted and oriented towards the latter (the presence of a dedicated button 23 as described before is then not necessary).

At step 13, a 180° rotation of the information displayed on the screen of the electronic device is carried out, according to the signal representative of a detection of said predetermined event delivered at step 11, and according to a status piece of information associated with said electronic device.

The presence of the signal representative of a detection of said predetermined event is a necessary condition for the implementation of the 180° rotation of the information displayed on the screen of the electronic input device.

In a particular embodiment, the presence of this signal is also a sufficient condition for the implementation of such a rotation. In this case, the 180° rotation of the information displayed on the screen of the electronic data-input device is implemented as soon as the expected predetermined event (for example a reversal of the pitch of the device or a press of an appropriate button) is detected at step 11.

However, in an alternative embodiment, the mere presence of the signal representative of a detection of said predetermined event does not lead to the systematic implementation of the 180° rotation of the information displayed on the screen of the electronic data-input device. In this embodiment, a status piece of information associated with the electronic data-input device (in other words a current state of said electronic device) is also taken into account. In particular, this status piece of information may correspond to a current state of progress of the operation being carried out on the electronic data-input device. For example, such a state of progress may be determined as a function of the current graphical interface displayed on the screen of the electronic device, or else of the current action being processed on the electronic device. According to a particular implementation of this embodiment, an optional step 12 is carried out, the result of this step defining an additional condition for the implementation of the 180° rotation of the information displayed on the screen of the electronic data-input device. For example, step 12 is a step of identifying a current action within the succession of actions that form the operation being carried out on the electronic data-input device. In this particular embodiment, the 180° rotation of the information displayed on the screen of the electronic input device is performed only if all of the following conditions are met: the expected predetermined event is detected at step 11, and the current action identified at step 12 corresponds to a predetermined action of the succession of actions that form the operation being carried out. Or, in other words, the 180° rotation of the information displayed on the screen of the electronic input device is performed only if all of the following conditions are met: the expected predetermined event is detected at step 11, and the current state of the electronic data-input device corresponds to a state for which a 180° rotation of the information displayed on the screen of the electronic device is authorised (for example because this current state is present in a list of reference states stored within the electronic data-input device, with regards to the operation being carried out on said device). In this manner, the detection of the predetermined event is coupled with a status piece of information relating to the electronic data-input device, which allows authorising or not the tilting of the display. For example, in the context of a payment transaction, the tilting, about a pitch axis, of the screen of the payment terminal from a position in which it is oriented towards the merchant into a position in which it is oriented towards the client will result in the 180° rotation of the information displayed on the screen only if the graphical interface displayed on the screen corresponds to an action to be carried out by the client. Otherwise, if the graphical interface displayed on the screen corresponds to an action to be carried out by the merchant, the 180° rotation of the information displayed on the screen is not performed: thus, the client could immediately notice that the information displayed on the screen, upside down, is not intended for him. Steps 11 and 12 may be processed in parallel or one after the other, regardless of the order.

Figure 3:
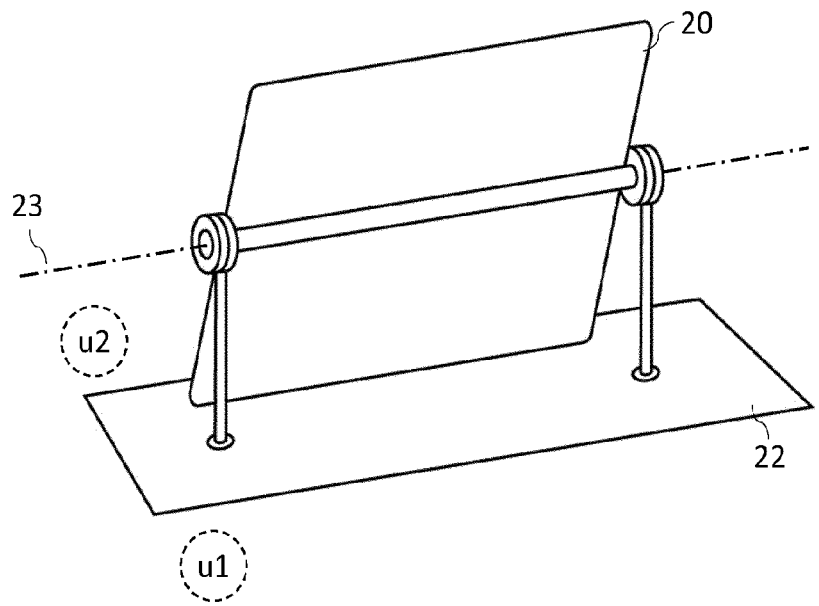
FIG. 3 shows the electronic data-input device of FIG. 2 as seen by the first user, after this device has been tilted towards a second user who stands facing the first user, in a particular embodiment of the proposed technique.
Figure 4:
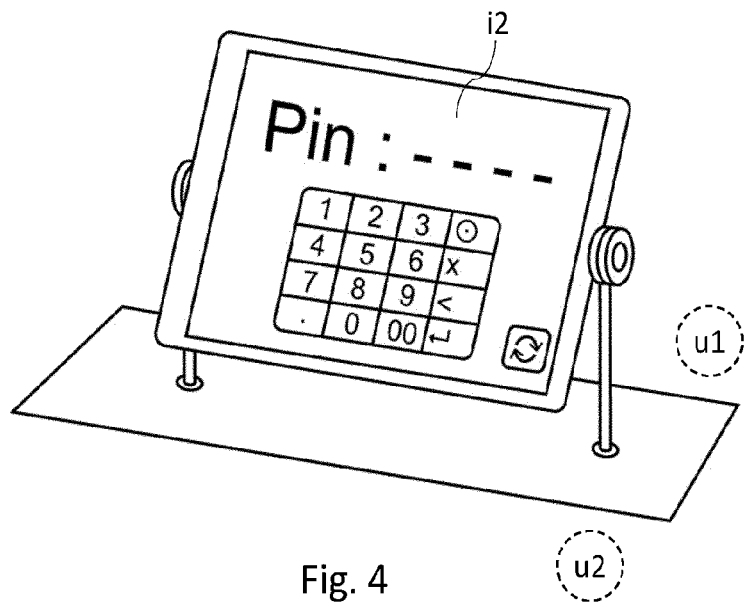
FIG. 4 shows the electronic data-input device of FIG. 3 as seen by the second user, in a particular embodiment of the proposed technique.
Figure 5:
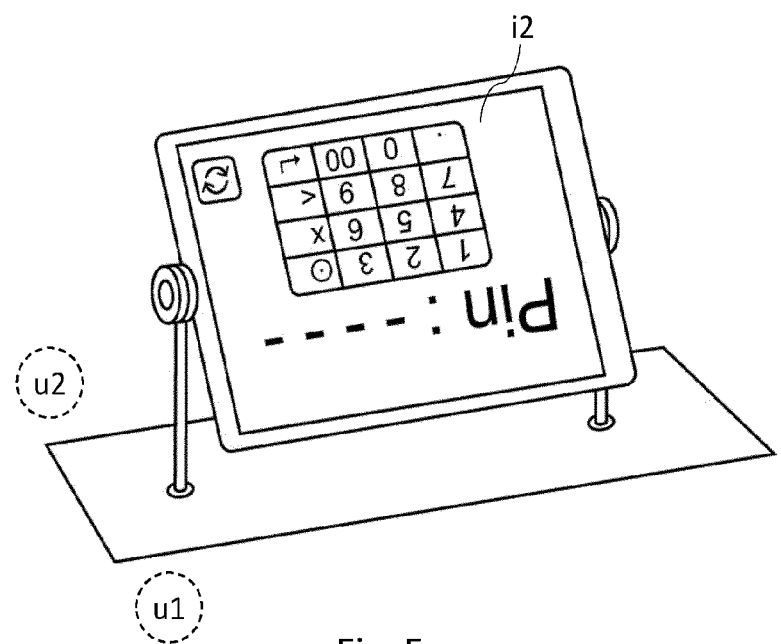
FIG. 5 shows an electronic data-input device with the screen oriented towards a first user, as seen by the first user, in another particular embodiment of the proposed technique.

According to one variant, when the detection of the predetermined event is carried out while the electronic device is not in a state authorising the 180° rotation of the information displayed on the screen, protective steps are triggered. For example, these protection steps are triggered in the event of detection of the predetermined event even though the status piece of information associated with said electronic device is absent from a list of reference states associated with said electronic device for said operation. In other words, the predetermined event is detected (for example a press on a specific button, or the tilting of the electronic device about its pitch axis resulting in a pitch reversal) at a progress level of the current operation on the device which does not normally require handing over to another user (for example, in the context of a payment transaction, the current state of the electronic device corresponds to an action to be carried out by the merchant, which normally does not require any immediate or short-term intervention of the client). These protective steps may be in different forms, such as turning off the screen of the electronic data-input device, deleting or hiding at least one portion of the information displayed on said screen (for example by displaying a black screen), disabling at least one touch button displayed on said screen, disabling at least one physical button of said electronic device, triggering an audible alarm, or else a partial or total blocking of the electronic data-input device. Thus, instead of being turned 180°, the display of information on the screen of the electronic device could, for example, be turned off so that the user (a priori the unauthorised user) at the initiative of triggering of the predetermined event (for example tilting of the electronic device from front to back so as to orient the screen towards him) could no longer read what has been previously displayed on the screen. Such a feature ensures that "sensitive" data (such as merchant account numbers for example) cannot be viewed by the user who is not authorised to perform the tilting. Alternatively or additionally, the electronic data-input device may also be blocked at least partially, so that the unauthorised user cannot interact with this device (in particular, some physical buttons of the electronic device could for example be disabled so that the user is not able to perform an unauthorised action). According to a particular feature, once they have been triggered, the deactivation of these protective steps requires the input of a confidential deactivation code on the electronic data-input device, or the implementation of a particular reset procedure of the electronic data-input device (this procedure being for example in the form of a combination of presses or a particular sequence of presses on very specific buttons of the electronic data-input device, possibly with holding of the support(s) for at least a predetermined duration). FIGS. 2 to 4 already presented, as well as FIG. 5 show an example illustrating how the proposed technique described before is implemented in the context of a payment transaction between a merchant and a client, and more particularly during the transition between two successive actions of such a transaction, namely the input, by the merchant u1 of an amount of the good or service that the client u2 wishes to acquire (via the interface i1 displayed on the screen 21 of the payment terminal 20), and the input, by the client u2, of a confidential code (PIN code) associated with a payment card used to pay this amount (via the interface i2 displayed on the screen 21 of the payment terminal 20). As presented before, different embodiments may be implemented. In a first embodiment, the validation by the merchant of the amount input in the interface i1, via the validation key 25, causes the display of the interface for inputting a PIN code, and it is only when the merchant tilts the payment terminal 20 towards the client (FIG. 3) that the 180° rotation of the information displayed on the screen is carried out, leading to the configuration illustrated in FIG. 4 in which the interface i2 for inputting the PIN code is correctly oriented for the client. In another embodiment, the validation by the merchant of the amount input in the interface i1, via the validation key 25, causes not only the display of the interface for inputting a PIN code, but also its rotation by 180°, leading to the configuration illustrated in FIG. 5. Afterwards, the merchant could tilt the payment terminal 20 towards the client, thus leading to the configuration illustrated in FIG. 4 in which the interface i2 for inputting the PIN code is correctly oriented for the client. In yet another embodiment, the merchant uses the button 23 dedicated to display rotation as soon as he wishes to operate a 180° rotation of the information displayed on the screen, so as to ensure that the interface is correctly oriented for the user responsible for carrying out the associated operation, once the screen is oriented towards this user. In this case, apart from the 180° rotation of the information displayed on the screen, pressing the dedicated button 23 does not cause any change of the interface.

According to a particular feature, the screen of the electronic data-input device is a lenticular screen configured so that the information displayed on this screen is not visible to a user when the screen is oriented towards another user. In particular, in the context of a payment transaction, such a lenticular screen prevents the merchant from seeing what the client inputs (such an input possibly relating to sensitive information, such as the PIN code associated with a bank card) once the screen has been tilted towards the client, and vice versa. Such a feature is particularly advantageous when the screen is only slightly tilted towards a user, which leaves it potentially visible to the other user: although the screen remains visible to this other user, the latter does not see the information displayed therein (and/or input if a touch keyboard is available on this screen).

The proposed technique also relates to an electronic data-input device comprising means enabling the execution of the method for controlling the display of information as described before. Such an electronic data-input device is shown in connection with FIG. 6 in a particular embodiment, and it comprises:

means for detecting a predetermined event associated with said electronic device, delivering a signal representative of a detection of said predetermined event;
means for rotating said information display by 180° on the screen of the electronic device, implemented as a function of said signal representative of a detection of said predetermined event and of status piece of information associated with said electronic device.

For example, the electronic data-input device comprises a memory 61 consisting of a buffer memory, a processing unit 62, equipped for example with a microprocessor, and controlled by the computer program 63, implementing in particular a method for controlling the display of information on a screen of the electronic data-input device. Upon initialisation, the code instructions of the computer program 63 are for example loaded into a memory before being executed by the processor of the processing unit 62. For example, the processing unit 62 receives as input E at least one instruction for initialising an operation to be carried out by means of the electronic data-input device (for example the initialisation of a payment transaction on a payment terminal). The microprocessor of the processing unit 62 then implements the steps of the processing method, according to the instructions of the computer program 63. It starts listening to predetermined events associated with the electronic data-input device, so as to deliver a particular signal if one of these predetermined events is detected. It also takes into account a status piece of information associated with said electronic device, which corresponds for example to a progress status of the operation being carried out on said electronic device. For example, it identifies a current action being carried out on the electronic data-input device. In case of a positive detection of a predetermined event, and where appropriate depending on the identified current action, a 180° rotation of the information displayed on the screen of the electronic device is performed, and the result of this processing is notified at the output S.

The invention claimed is:

1. A method for controlling a display of information on a screen of an electronic data-input device, said electronic device being configured to be used to implement an operation involving completion of a succession of actions and involving a plurality of users, said method comprising:
detecting a predetermined event associated with said electronic data-input device, delivering a signal representative of a detection of said predetermined event, said predetermined event corresponding to a reversal of a pitch of said screen of said electronic data-input device, subsequent to a tilting of said screen about a pitch axis of said screen; and
rotating said information display by 180° on the screen of the electronic data-input device, as a function of said signal representative of a detection of said predetermined event and of a status piece of information associated with said electronic data-input device, wherein said status piece of information comprises an identification of a progress status of the operation being carried out on the electronic data-input device.

2. The method according to claim 1, wherein the method further comprises identifying a current action to be carried out within said succession of actions, and implementation of said 180° rotation further depends on said identified current action.

3. The method according to claim 1, wherein the method further comprises triggering at least one step of protecting said electronic data-input device, when the following two conditions are met:
said predetermined event is detected; and
said status piece of information associated with said electronic data-input device is absent from a list of reference states associated with said electronic data-input device for said operation.

4. The method according to claim 3, wherein the at least one step of protecting said electronic data-input device belongs to the group consisting of:
turning off said screen of the electronic data-input device;
deleting or masking at least part of the information displayed on said screen of the electronic data-input device;
disabling at least one touch button displayed on said screen of the electronic data-input device;
disabling at least one physical button of said electronic data-input device;
triggering an audible alarm.

5. The method according to claim 1, wherein electronic data-input device is a payment terminal and said operation is a payment transaction.

6. An electronic device configured to implement an operation involving completion of a succession of actions and involving a plurality of users, said electronic device comprising:
a screen for displaying information related to said operation;
a processor; and
a non-transitory computer-readable medium comprising instructions stored thereon which when executed by the processor configure the electronic device to:
detect a predetermined event associated with said electronic device, delivering a signal representative of a detection of said predetermined event, said predetermined event corresponding to a reversal of a pitch of said screen of said electronic device, subsequent to a tilting of said screen about a pitch axis of said screen; and
rotate said information display by 180° on the screen of the electronic device, implemented as a function of said signal representative of a detection of said predetermined event and of a status piece of information associated with said electronic device, wherein said status piece of information comprises an identification of a progress status of the operation being carried out on the electronic data-input device.

7. A non-transitory computer-readable medium comprising program code instructions stored thereon for execution of a method for managing display of information on a screen of an electronic device, when the instructions are executed on a computer, said electronic device being configured to be used to implement an operation involving completion of a succession of actions and involving a plurality of users, and wherein the method comprises:
detecting a predetermined event associated with said electronic device, delivering a signal representative of a detection of said predetermined event, said predetermined event corresponding to a reversal of a pitch of said screen of said electronic device, subsequent to a tilting of said screen about a pitch axis of said screen; and rotating said information display by 180° on the screen of the electronic device, as a function of said signal representative of a detection of said predetermined event and of a status piece of information associated with said electronic device, wherein said status piece of information comprises an identification of a progress status of the operation being carried out on the electronic data-input device.

\* \* \* \* \*